United States Patent
Landert et al.

(10) Patent No.: US 6,496,220 B2
(45) Date of Patent: Dec. 17, 2002

(54) METHOD AND ARRANGEMENT FOR DRIVING DOOR INSTALLATIONS AS A FUNCTION OF THE PRESENCE OF PERSONS

(75) Inventors: Heinrich Landert, Am Fasnachtsbuck 24, CH-8180 Bulach (CH); Martin Bichsel, Bertschikon b/Attikon (CH)

(73) Assignee: Heinrich Landert, Bulash (CH)

( * ) Notice: Subject to any disclaimer, the term of this patent is extended or adjusted under 35 U.S.C. 154(b) by 0 days.

(21) Appl. No.: 09/005,455

(22) Filed: Jan. 12, 1998

(65) Prior Publication Data

US 2001/0048470 A1 Dec. 6, 2001

(30) Foreign Application Priority Data

Jan. 13, 1997 (DE) .......................... 197 00 811

(51) Int. Cl.$^7$ ................................. H04N 7/18
(52) U.S. Cl. ............... 348/143; 348/152; 340/5.62; 340/541; 340/572; 340/10.5; 49/31; 318/286; 318/468; 318/652
(58) Field of Search .................. 348/143, 152, 348/154, 155, 156, 153; 340/572, 5.62, 541, 10.5; 382/155, 100; 49/31; 318/286, 468, 652

(56) References Cited

U.S. PATENT DOCUMENTS

| | | | |
|---|---|---|---|
| 4,249,207 A | * 2/1981 | Harman et al. | 358/108 |
| 4,928,175 A | 5/1990 | Haggren | |
| 5,099,324 A | 3/1992 | Abe | |
| 5,163,094 A | * 11/1992 | Prokoski et al. | 382/2 |
| 5,182,776 A | * 1/1993 | Suzuki et al. | 382/100 |
| 5,313,060 A | * 5/1994 | Gast et al. | 250/221 |
| 5,541,585 A | * 7/1996 | Duhame et al. | 340/572 |
| 5,583,405 A | * 12/1996 | Sai et al. | 318/286 |

FOREIGN PATENT DOCUMENTS

| | | |
|---|---|---|
| DE | 36 34 628 C2 | 10/1986 |
| DE | 38 25 757 A1 | 7/1988 |
| DE | 41 10 649 A1 | 4/1991 |
| DE | 43 35 301 C1 | 10/1993 |
| DE | 44 02 535 A1 | 1/1994 |
| DE | 44 17 128 A1 | 5/1994 |
| DE | 44 30 016 A1 | 8/1994 |
| DE | 195 16 662 A1 | 5/1995 |
| DE | 195 25 875 A1 | 7/1995 |
| DE | 196 00 958 A1 | 1/1996 |
| DE | 296 02 098 U1 | 2/1996 |
| DE | 195 22 760 A1 | 6/1997 |
| EP | 0 344 404 A1 | 2/1989 |
| EP | 0 356 734 A2 | 7/1989 |
| EP | 0 445 334 A1 | 3/1990 |

* cited by examiner

Primary Examiner—Chris Kelley
Assistant Examiner—Shawn S. An
(74) Attorney, Agent, or Firm—Lackenbach Siegel Marzullo Aronson & Greenspan

(57) ABSTRACT

The invention relates to a method and an arrangement for driving door installations as a function of the presence of person wherein the region of the door installation is continuously observed by at least one videocamera. According to the invention through the videocamera and/or suitable sensors, object motions within the space to be monitored are acquired with an analysis being carried out in conjunction with the video image of whether or not the moving object is a person. If this is the case, its location and/or direction of movement is determined and the door installation is driven as a function thereof. The videocamera is preferably disposed approximately diametrically opposite the door installation with its angle of view being directed as steeply as possible onto the region to be monitored. The videocamera is connected to an electronic image processing device.

1 Claim, 5 Drawing Sheets

Figure 1:
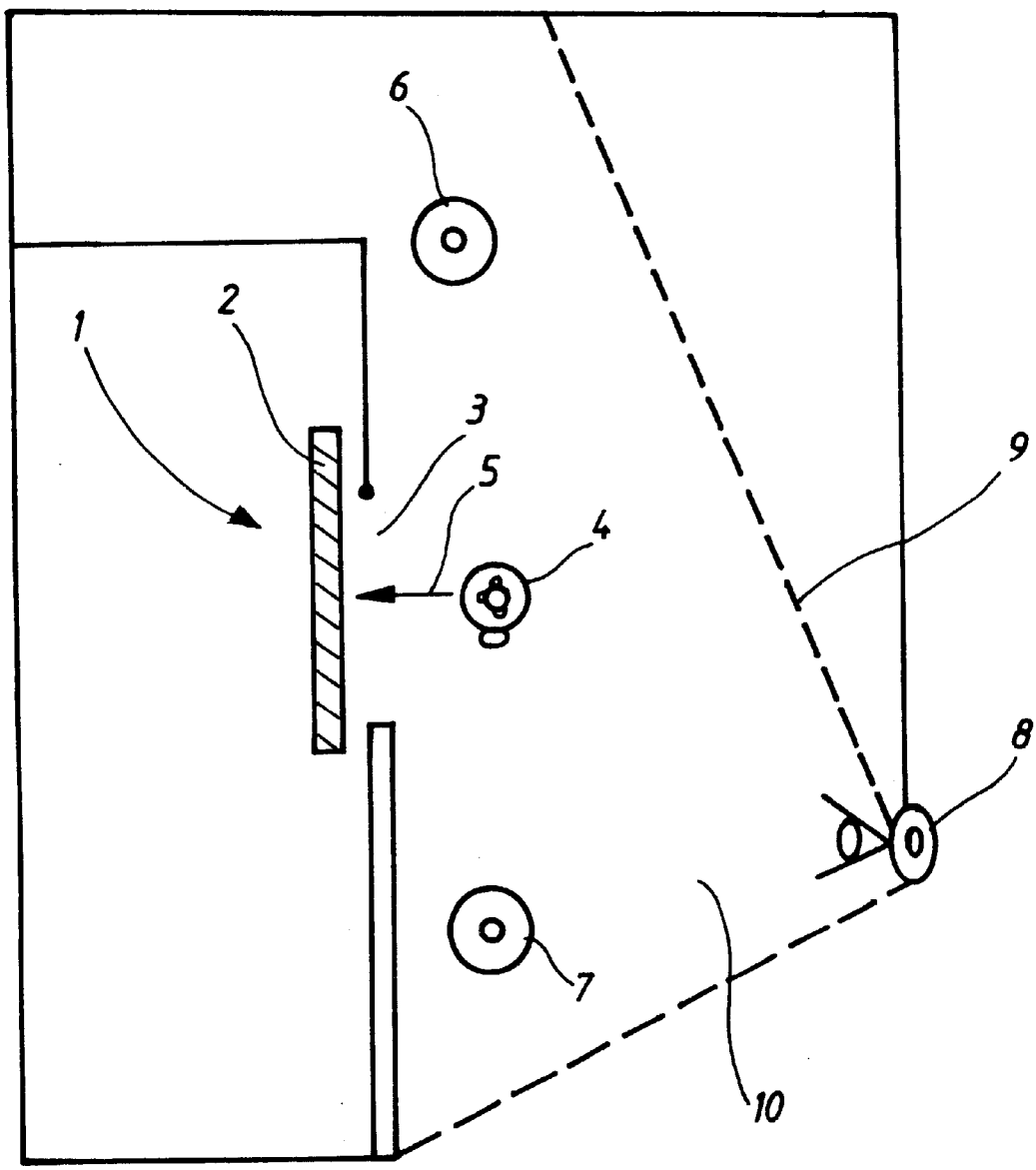

METHOD AND ARRANGEMENT FOR DRIVING DOOR INSTALLATIONS AS A FUNCTION OF THE PRESENCE OF PERSONS

Subject matter of the invention is a method and an arrangement for driving door installations wherein the acquisition and evaluation of persons in front of door installations is carried out with the goal of opening and closing door installations as a function of persons moving in front of the door installations.

Such method is disclosed for example with the subject matter of U.S. Pat. No. 4,249,207 A. In this known arrangement a so-called video entrance alarm is generated if one or several persons enter a specific monitoring area. For this purpose the monitoring area is divided into a specific number of subareas and an investigation is carried out regarding the presence or absence of persons in these cell-like subareas. According to the condition detected a corresponding alarm is subsequently triggered.

The invention is based on the task of further developing a method and a device of the above cited type such that with minimum expenditures one or several door installations in a building can be controlled as a function of the location, the direction of movement and the number of persons in front of these door installations.

To solve the task posed the invention is characterized by the technical teaching of claim 1 or claim 18.

It is a characteristic of the invention that initially in a first process step the space in front of the door installation is acquired with at least one video camera and specifically in such manner that first only the "empty space" is acquired. By the term "empty space" is understood that this space is acquired at a point in time at which no or only few motions by persons take place in this space. For example, the space to be monitored in front of the door installation is initially acquired by the video camera at a point in time at which substantially no motion takes place in this space, for example early in the morning or late in the evening wherein the stationary objects usually disposed in this space, such as for example planters, lampposts and the like, are acquired by the videocamera and the system learns the location and the configuration of these stationary objects.

As empty space is here defined if in the space to be monitored within a time period of approximately 3 to 4 seconds no motion of any kind takes place or is detected. Based on this, a so-called reference image is obtained which serves as a reference model of the empty space, i.e. the empty space with all its objects is stored as a model in a memory and serves as a measure of comparison.

In a preferred embodiment of the present invention it is provided that the videocamera examines approximately every 3 to 4 seconds whether or not the space is empty and—should this be the case—creates a new reference model of the empty space. It is herein important that in these time intervals a complete new model of the empty space is not always created but rather that in an iterative approximation process this empty space is continuously approximated to the actual conditions. This means in practice that if no motion has been detected within the last 3 to 4 seconds, but new objects have been recognized as being stationary in the empty space, that this model of the empty space is only expanded and supplemented by the newly added stationary object.

After in a first process step a model of the empty space has been generated, the empty space is now continually and regularly observed with the videocamera in order to determine whether or not the space is in fact empty or whether a motion is taking place in this space.

If a motion is detected in this space, which can take place by evaluating the video image or can also be determined by including further signal sources, such as for example infrared detectors, weight sensors and ultrasound sensors, in the case of a non-empty space, i.e. in the event of acquired motion, determination takes place in a subsequent process step of whether or not the moving object is an object authorized to use the door installation and also intending to do so, for example a person.

For this purpose a pattern analysis of the moving contour is carried out, i.e. a moving person is only recognized as being a person if the moving contour covers a specific area and form and notion of the acquired contour resemble those of a human being. This means, for example, a moving baby carriage is not recognized as a moving person because the form of the baby carriage does not correspond to that of a person. However, the person pushing the baby carriage is recognized.

Moving animals (for example dogs or cats) are not recognized as moving person due to the differing motion contour and therefore the door installation is consequently also not driven unless the use of the door by these animals is intended.

After the acquisition and analysis of the motion contour in the previously described second process step, in the third process steps, as cited above, the motion contour of the person is analyzed. If it is recognized that this case is one of a moving person, the location of the moving person is determined in a fourth process step. It is herein important that first the distance of the person from the videocamera is determined. Based on this distance measurement the precise location in the space can subsequently be calculated, i.e. it is possible to specify in terms of coordinates precisely where the person in front of the door installation is located.

In a preceding process step it is also specified that the videocamera has, of course, also acquired, together with the acquisition of the empty space, a plan model of the space with the position of the door, and that this plan model is stored in a memory.

In a further, differing embodiment example it is provided that the plan model is not acquired by the camera (potentially also by another camera), but rather that the plan model is written through manual entry at a corresponding terminal into the memory of the computer where it is subsequently stored.

Based on the coordinates of the moving person and based on the comparison with the stored plan model, it is now readily possible to acquire the type and direction of movement of the moving person in front of the door installation.

In a further process step now the monitoring area is divided into different regions wherein at least one region is defined as that, upon entrance of which, the door installation is driven while other regions are present which do not lead to the driving of the door installation.

Only if the acquired motion model predicts that the person intends to enter or is entering the region of the monitoring area associated with the door installation, is an opening signal output to the door installation and the door installation is opened.

This region model has the advantage that the door installation is not opened if the videocamera, in connection with the above listed regions, acquires for example a person running past the door installation, who, based on the direction of movement and rate of movement, apparently does not intend to walk into the door installation. In this way with the novel process model it is achieved that the door installation is only driven to open or close if a person moving in front of the door installation is heading toward the door installation at the appropriate speed and direction of movement.

The opening and closing of door installations from the inside of the building takes place analogously so that on the inside of a building a corresponding monitoring installation can also be disposed which accomplishes the intelligent opening and closing of the door installation as a function of a person leaving the building.

In a further embodiment of the present invention it is provided that in a subordinated process step a determination takes place of the width of the person who is heading toward the door installation. It can herein be determined for example whether the person is pushing a baby carriage, whether the person is carrying several packages or has some other unusual opening requirement of the door. The wider the person, the wider the door installation can be opened and the door installation can accordingly only be opened far enough to ensure the easy and comfortable passage of the person moving in front of the door installation. For this entails the advantage that the door is only opened so far that the unnecessary heat and convective flow loss from the building to the outside is avoided.

It is likewise provided in a further development of the present invention that the start and/or the speed of door opening and/or door closing is driven as a function of location, direction of movement and especially by the rate of movement of the persons approaching the door installation. A person approaching the door installation rapidly and whose presence is acquired in the triggering door region, leads to a more rapid opening of the door wings than a person approaching relatively slowly in comparison.

In a further development of the present invention it is provided that light reflections in the monitoring area, for example on the floor, in the region of the walls of the door installations or on other containment walls are eliminated thereby that the videocamera operates with a polarization filter.

The potential casting of shadows by the persons to be monitored is recognized and eliminated thereby that particular recognition criteria can be associated with the shadow and thus can exclude the casting of a shadow such that effectively only the motion contour of the person to be monitored itself is acquired but not its light shadow.

In a preferred embodiment of the present invention (arrangement) it is preferred if the camera is disposed approximately diametrically with respect to the door installation but in a somewhat raised position of, for example, 5 m above the ground because with this elevated position diametrically opposite to the door installation the advantage is achieved that with a camera disposed as high as possible a relatively small angle of view of the camera onto the person to be monitored is achieved, i.e. an extremely high-resolution recognition of the persons moving below the camera is possible.

It is understood that the invention is not limited thereto, several cameras can also be disposed whose angles of view also intersect wherein the camera image of several cameras is evaluated.

It is also possible to use a stereo camera instead of a single monocular videocamera. Assuming a predefined image area the image of the one camera can be transferred to the image to be expected from the second camera and by comparison of the calculated and effectively received image conclusions can be drawn regarding the presence and/or changes of objects in the image area.

Therein the predefined image area is adapted or newly selected in the course of successive image analyses based on the results available in each instance. It is possible to adapt or newly select further parameters such as for example image segment, frequency of image analyses, image resolution in the course of successive image analyses based on the particular available results wherein in order to achieve absolute operational reliability the data of elements multiply provided (for example several cameras) are utilized.

It is also provided that in addition to the videocamera, which opposes the door installation diametrically, still further cameras are disposed which, for example, are disposed laterally in front of the door installation.

In a further embodiment of the invention it is provided that with a camera disposed relatively low, for example at a level of approximately 2 m, a high observation point is achieved thereby that the camera image is deflected via a mirror disposed at a high level and the monitoring area is acquired from this mirror.

The subject matter of the present invention is evident not only based on the subject matter of the individual patent claims but rather based on the combination with one another of the individual patent claims.

All specifications and characteristics disclosed in the documents, including the abstract, in particular the spatial implementation depicted in the drawings are claimed as being essential to the invention to the extent they are novel individually or in combination relative to prior art.

In the following the invention will be explained in further detail in conjunction with the drawings representing only one embodiment path. Herein in the drawings and their description further characteristics and advantages essential to the invention are evident.

Figure 2:
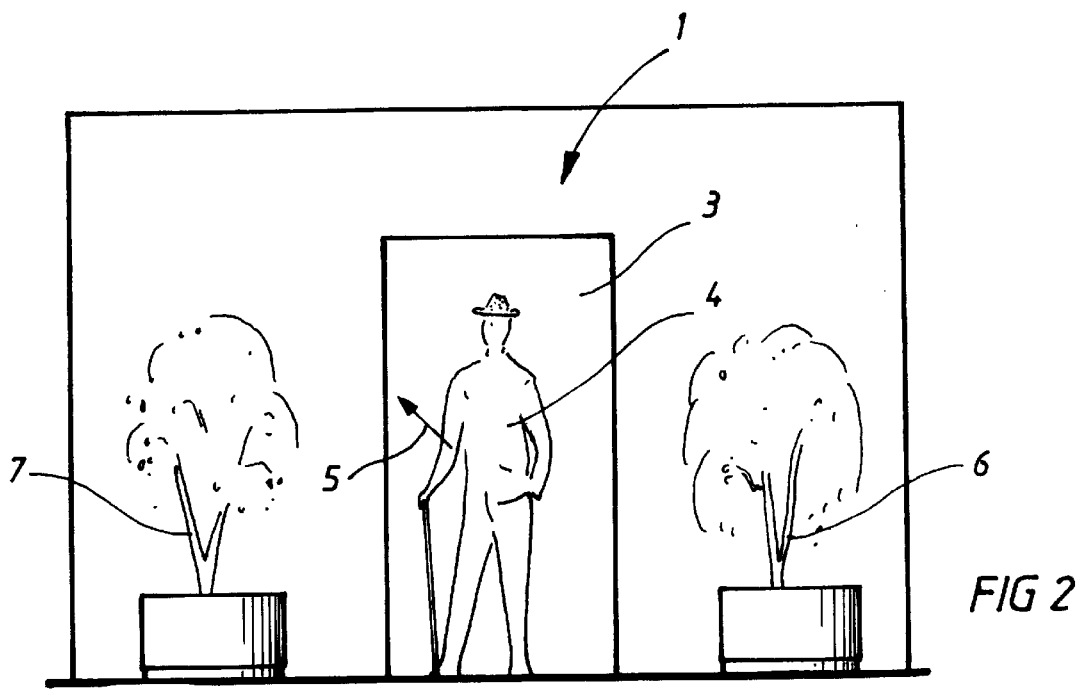
Figure 3:
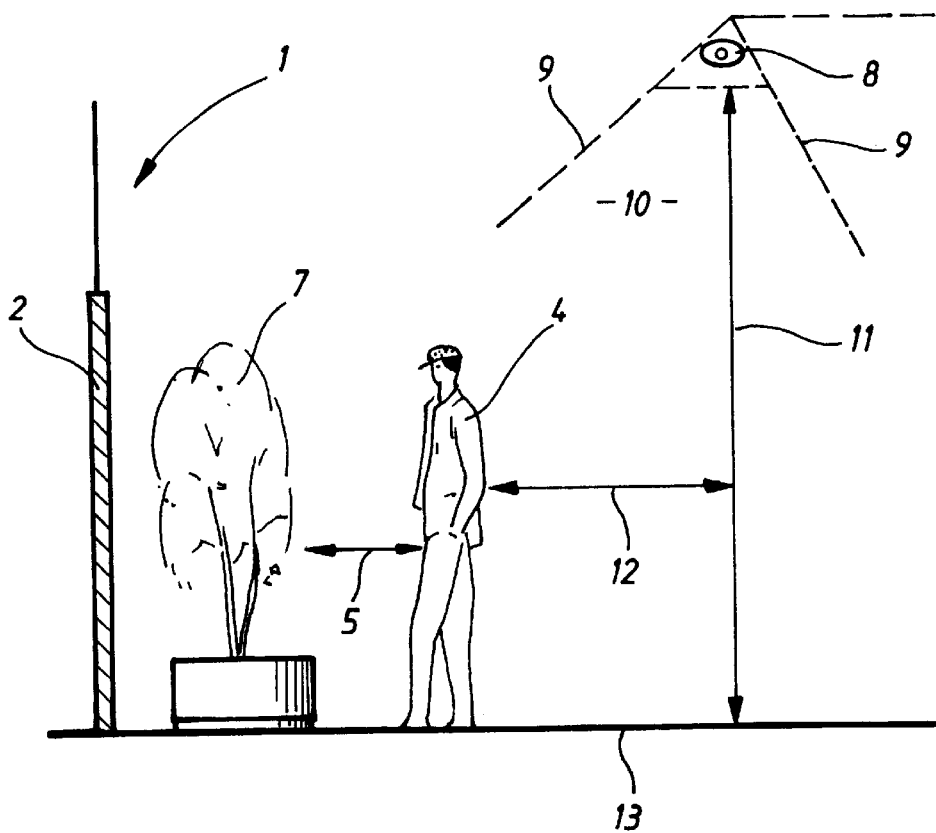
Figure 4:
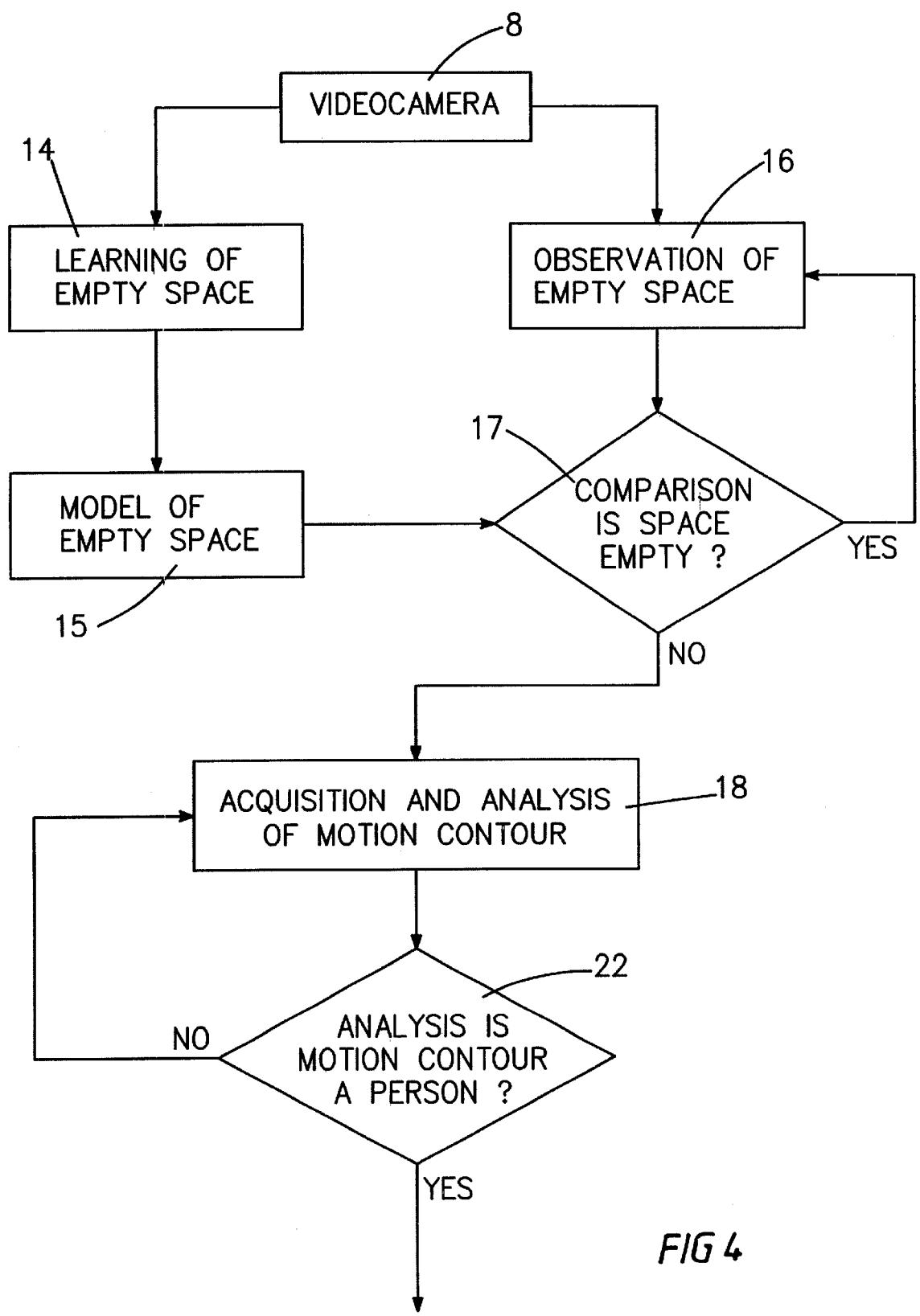
Figure 5:
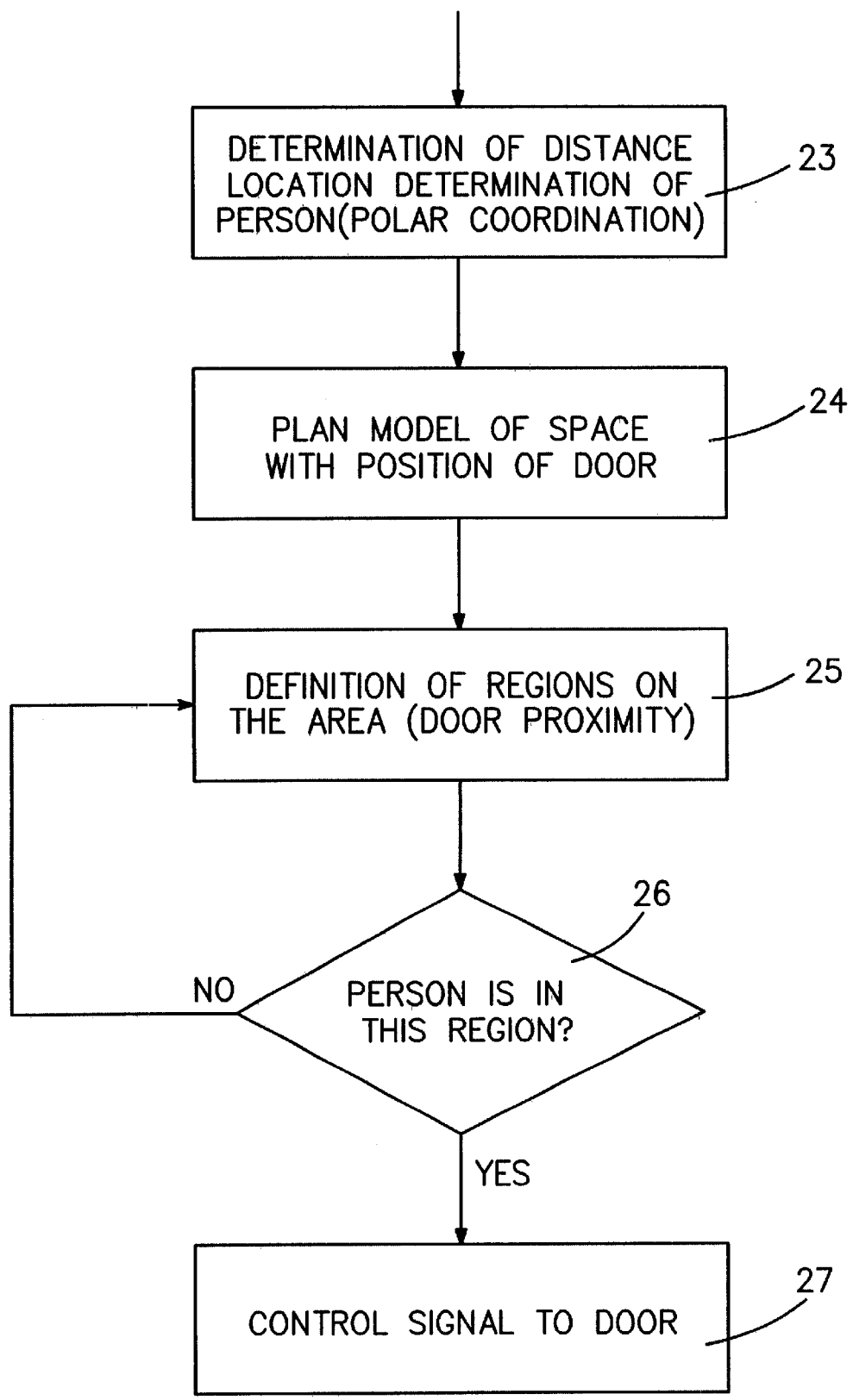
Figure 6:
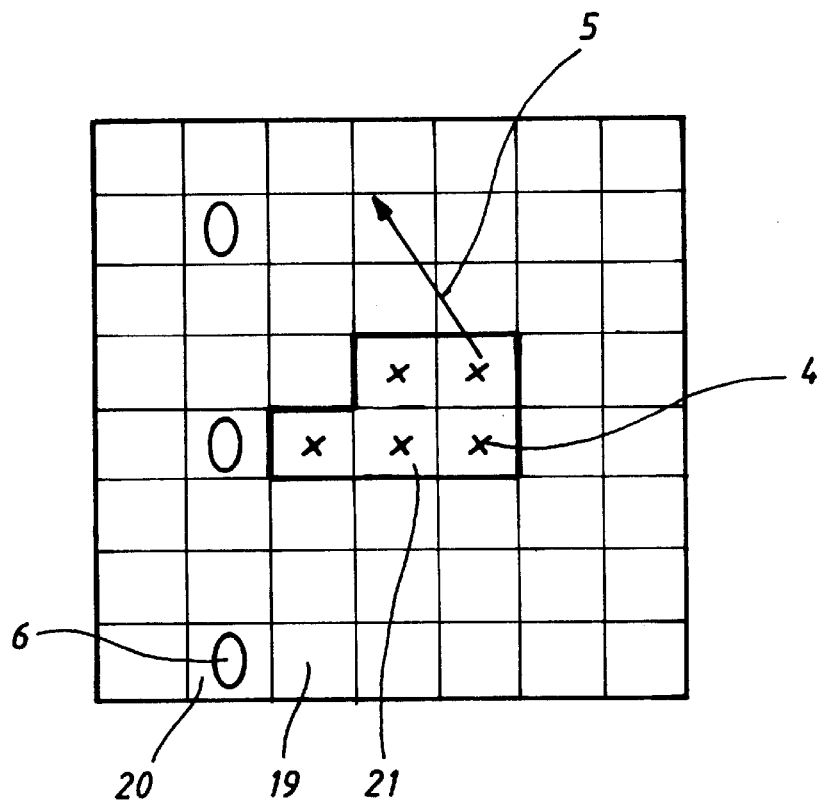
Figure 7:
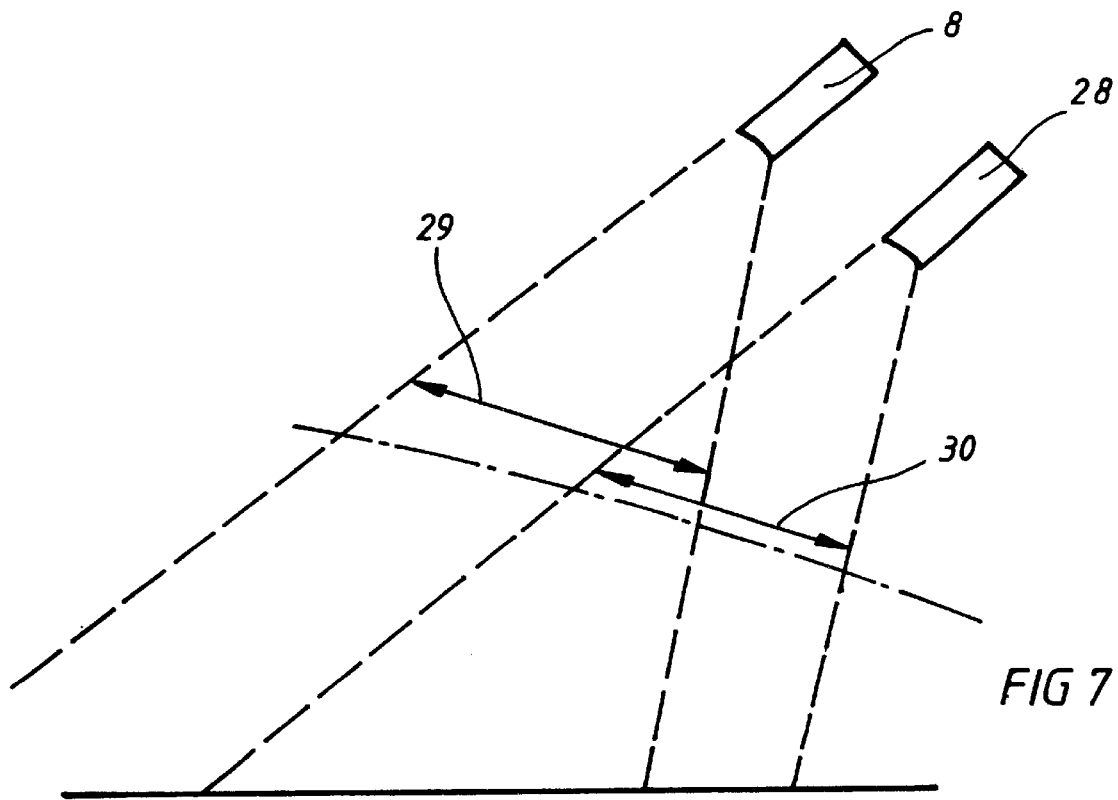

In the drawings show:

FIG. 1 schematically in top plan view the condition in front of a door installation;

FIG. 2 front view of the door installation according to FIG. 1;

FIG. 3 side view of the door installation according to FIGS. 1 and 2;

FIG. 4 first portion of the process diagram;

FIG. 5 second portion of the process diagram;

FIG. 6 schematically an evaluation image of the videocamera;

FIG. 7 by example the use of two parallel cameras (stereo camera).

In FIG. 1 as an example a door installation 1 of a building is depicted wherein a single-wing sliding door 2 is used. It is understood that this invention is not limited to the use of such a door installation. Instead of a single-wing sliding door, multi-wing sliding doors can be used, folding doors, lifting doors, revolving doors, pivot doors and similar further door models can be used. The issue in the present invention is thus substantially the opening and closing in an intelligent manner of one or several entrance openings 3 in a building as a function of persons 4 located in front of the door installation 1.

For this purpose the invention provides at least one videocamera 8 which opposes approximately diametrically the door installation 1 and which has an observation angle 9 defining a relatively large monitoring area 10. This monitoring area 10 should advantageously comprise the door installation 1 itself and a relatively wide side region of approximately 3 m on the left and right of the door installation in order to acquire and exclude reliably persons passing the door installation 1.

In the application example shown stationary objects 6, 7 are additionally disposed in the monitoring area 10 which can for example be planters or the like. Incidentally, the person 4 is moving in the direction of arrow 5 toward the door installation 1.

FIGS. 2 and 3 depict the same condition as FIG. 1, and it can be seen that the camera 8 can also be disposed at an elevated location above the ground 13. Herein the camera 8 is disposed at a height 11 above the ground 13 as well as at a distance 12 from the person 4 to be observed.

In FIG. 4 the various process steps are depicted in succession wherein the videocamera 8 initially creates at position 14 a model of the empty space. Reference is made to the general description in which was indicated that the monitoring area is recognized as empty space if within for example 3 to 4 seconds no motion takes place in this space.

At position 15 subsequently a model of the empty space is created and the videocamera 8 monitors simultaneously at position 16 this empty space to determine whether or not a motion takes place.

At position 17 it is examined whether or not the space is empty. If it is empty, further observation of it takes place, if it is not empty, the determination subsequently takes place at position 18 of whether or not the moving object is a person. In this connection reference is made to FIG. 6 where as the evaluation model the empty space is shown in the form of a raster and it can be recognized that a multiplicity of cells 19, 20, 21 is present with the cells being arranged like a matrix in rows and columns and as an example it is specified that cell 20 is filled with a stationary object, for example the stationary object 6, 7. In these monitoring spaces the person 4 to be acquired is recognized as a motion cluster covering a series of cells 21 with this motion cluster moving in the direction of arrow 5.

At position 22 now an analysis of the motion contour takes place. As motion contour is here understood according to FIG. 2 a motion cluster which covers for example five cells 21 with these cells being contiguous and moving uniformly for example in the direction of arrow 5.

If such motion pattern (motion contour) is detected, which moves uniformly in a specific direction, this cluster can be recognized as a human model.

Thus if it is recognized at position 22 that this is a moving human and a decision is made accordingly, then according to FIG. 5 at position 23 the distance 12 of the moving motion cluster is determined with respect to the videocamera 8. Based on it, a location determination of the moving person is subsequently carried out, wherein for example the location is specified in polar coordinates. Thus, the current position of the moving person in the monitoring area 10 is determined and simultaneously, based on the movement and the speed, a prediction is made of whether or not the person is entering the region of the monitoring area 10 associated with the door opening.

At position 24 initially a plan model of the space comprising also the position of the door is compared with the motion pattern of the moving person.

According to the general explanation this plan model was either entered manually at the keyboard or it is acquired with a videocamera and stored in a memory.

Now the plan model of the space is compared with the motion pattern of the moving person and at position 25 a check takes place of whether or not this person is entering a region of the monitoring area 10 which is associated with the opening of the door. This region is advantageously disposed directly in front of the door installation, preferably this door region is defined as a distance of 1 m to the left and right of the door opening and a distance of approximately 1.50 m in front of the door.

Thus if, based on the prediction according to number 23 and the further measurement of the motion profile of this person, this door area is entered, then according to FIG. 26 a decision is made that this door area has been entered and at position 27 the door is driven to open.

Herein it is additionally determined how fast the person approaches the door in order to adapt the time of the start and/or the speed of the door movement to this movement. This opening control at matching speed is however only cited as a further embodiment example of the invention with the invention being in general directed to the opening of the door.

FIG. 7 shows schematically the use of a stereo camera. Based on the image of the first camera 8 it is calculated what the second camera 28 should "see" under the precondition that the observed image segment 29 of camera 8 lies effectively in the image area 30 of camera 28. If the calculated image agrees with the image effectively "seen" by camera 28, an object lies effectively in the image plane acquired by both cameras 8, 28.

Reference has already been made in the general specification portion that in a further process step the space requirement necessary for the unhindered passage of the door installation, for example the width of a person moving toward the door installation, is also acquired. The opening of the door installation of the approaching person is varied accordingly.

If, in contrast, a mass grouping of persons occurs in the monitoring area, the decision is made only once of whether the persons are heading toward the door installation and the door is subsequently held open only once for a specific length of time. Analysis of the moving objects in the proximity of the door thus takes always place with the goal of controlling optimum responses of the door with respect to user friendliness, minimizing heat loss etc.

It is understood that the door installation is driven according to further parameters, such as for example by parameters of emergency opening, emergency closure, fire alarm, burglar alarm and similar parameters. The intelligent opening and closing of the door installation is thus only one operating model for a door installation for the normal case.

With the technical teaching according to the invention thus the substantial advantage is attained that ventilation and heat losses of door installations on buildings are optimally avoided because the door is adapted precisely to those requirements which are made of it if one or several persons want to enter or leave the building.

Therewith increased security is also given because the door, for example, does not close if persons are located in the door space, i.e. directly in the closure path of the door.

List of Reference Numbers In The Drawings

1 Door installation
2 Sliding door
3 Entrance opening
4 Person
5 Direction of arrow
6 Object
7 Object
8 Videocamera
9 Observation angle
10 Monitoring area
11 Height
12 Distance
13 Ground
13–18 Position
19 Cell

20 Cell
21 Cell
22–27 Position
28 Videocamera
29 Image area
30 Image area

What is claimed is:

1. A method of controlling door installations as a function of the presence of objects and persons, wherein the region of the door installation is continuously observed by at least one video camera and optional sensor comprising the steps of:

monitoring motions of said object and person within the space through said at least one video camera and optional sensor, apprehending data from said at least one said video camera and optional sensor representative of the nature of the objects and persons moving within said space as well as their location, direction and speed of movement in relation to said space; and analyzing the video image and optional other sensed data to determine whether the moving object is a person authorized to use the door installation and is intending to do so, and, if so, determining the location and direction and speed of movement of the moving object, and controlling the door as a function of the location and the direction and speed of movement of the object, and wherein the space required by an object for the unhindered passage of the door installation, for example, the width of a person, is determined and thereby the matching of the opening width of the door to the object width takes place.

* * * * *